United States Patent [19]

Grosner

[11] Patent Number: 4,477,527

[45] Date of Patent: Oct. 16, 1984

[54] SHAPES FOR SEALING OR JOINING MATERIALS TOGETHER

[75] Inventor: George J. Grosner, Newton, Conn.

[73] Assignee: Vitta Corporation, Wilton, Conn.

[21] Appl. No.: 431,652

[22] Filed: Sep. 30, 1982

[51] Int. Cl.³ ............................................. C08K 3/08
[52] U.S. Cl. .................................... 428/401; 524/439; 524/440; 524/441; 523/442; 523/457; 523/458; 523/459; 148/22
[58] Field of Search ............... 523/442, 457, 458, 459; 524/439, 440, 441; 148/22; 29/DIG. 4; 428/385, 401

[56] References Cited

U.S. PATENT DOCUMENTS

| | | | |
|---|---|---|---|
| 2,965,930 | 12/1960 | Paul | 523/457 |
| 3,166,402 | 1/1965 | Berson et al. | 148/22 |
| 3,171,734 | 3/1965 | Berson et al. | 524/440 |
| 4,301,211 | 11/1981 | Sloboda | 428/385 |
| 4,325,754 | 4/1982 | Mizuhara et al. | 524/440 |

FOREIGN PATENT DOCUMENTS 573338  11/1945  United Kingdom ............... 524/440

*Primary Examiner*—Lewis T. Jacobs
*Attorney, Agent, or Firm*—Marius J. Jason

[57] ABSTRACT

A stable, mechanically formed brazing shape comprising a polymer matrix which may be composed of thermosetting and thermoplastic resins in various combinations and braze alloys or compounds which when formed by extrusion, dried, and cured is able to replace brazing pastes, loose powders and tapes in many brazing applications especially those requiring the deposition of a uniform amount of alloy in the brazed or bonded joint. The fabrication of shapes of various cross sections by extrusion is also described.

8 Claims, No Drawings

SHAPES FOR SEALING OR JOINING MATERIALS TOGETHER

BACKGROUND

The present invention is in the field of metal joining by means of brazing using a brazing alloy to join the two parts together.

Brazing technology currently uses tapes, paste, or powder as the joining medium.

Brazing tape is a dispersion of brazing alloy in an organic vehicle which carries the alloy to the point of joining and is ideally suited to joining flat structures such as honeycomb to sheet or sheet to sheet or extrusion to sheet or Honeycomb. Brazing tape can be supplied with an adhesive coating which will hold the matrix of organic binder and braze metal to one surface while the temperature of the entire structure is raised to burn off the organic component and eventually liquify the brazing alloy to effect the bond.

Brazing tape does not work well when the metals to be joined are mechanically fitted together and need a seal on an irregular surface as when a pair of nesting concentric rings are bonded together. The tape cannot usually be slit narrow enough to fit into the crevices which may have irregular 0.040" to 0.060" openings.

Brazing paste or powder has been used to seal narrow openings with the result that the braze joint may have voids due to uneven application of the paste or poor distribution of the powder. Voids often require a second application of either paste or powder and a second firing of the part to braze the joint.

Brazing paste is a dispersion of braze powders in a liquid vehicle which is usually water based.

Brazing paste is supplied in tubes or cartridges for application by a pressure gun usually powered by compressed air.

The diameter of the orifice through which the paste is delivered, the air pressure used, and the speed at which the gun is moved over the work pieces determines the size of the extruded bead and its uniformity.

With brazing paste as the joining medium, viscosity is critical and a thin paste or a high ambient temperature at the time of application may cause excessive flow within the joint and lead to starved areas which could result in weak spots, leaks, or burn through.

A high viscosity paste will usually not flow evenly at ambient temperatures and may not penetrate deep enough into a narrow joint (0.030" to 0.060") leaving a gap or void. Paste is hard to apply evenly to large parts with long sections or large diameters.

Brazing pastes have limited working life and may lose application properties on aging in both bulk and cartridge. These application properties are a result of change in viscosity and are usually not reversible.

Brazing powders can be applied by physically spreading the material over an adhesive layer manually or spraying the powder over the parts by means of a spray gun which will provide a more even distribution of alloy. More than one application is usually necessary to deposit sufficient alloy.

Brazing powders used in narrow joints are usually dependent upon the application of an adhesive to the joint and its ability to accumulate sufficient powder which when melted will fill the joint and any voids, to provide a good seal and form a strong bond. Most brazing powder joints do not have an even distribution of alloy and are very prone to voids and weak spots.

It is a principal object of this invention to provide a material produced by an extrusion process which can be used to join metals together which is uniform in structure or matrix and can be easily applied to the parts to be joined.

It is a further object of this invention to provide this joining material produced by an extrusion process in a shape or shapes to allow for ease of application and taylored to the joint which must be made.

It is a further object of this invention to impart to these extruded joining materials physical properties such as tensile strength, elongation, handling ease, and storage life not available in present tape, paste, or powder.

It is a further object of this invention to produce a shape or configuration which can be used to separate or stop flowing braze alloy by replacing the metal component with an inorganic pigment of appropriate composition.

A further object of this invention is to provide a procedure for fabricating shapes by extrusion different from conventional materials which are brazing tapes, pastes, and powder slurries of deposits.

A further object of this invention is to provide by extrusion a braze shape such as a cylindrical bead or a rectangular strip or other configuration by incorporating a polymer backbone binder which will produce the shape and impart desirable physical properties making the shape a dimensionally stable product.

Other objects and advantages of the invention will become apparent from the following descriptions thereof.

SUMMARY OF THE INVENTION

This invention relates to a composition of matter and its fabrication by extrusion, which is utilized as a brazing medium or composite that can be more flexible than current brazing tapes, is more stable than brazing paste, and provides a much more uniform joint than paste, powder, or present tape in many applications. In addition, this invention is easily stored and handled as it is a stable material with a definite shape or cross section which may be round, eliptical, multisided, triangular, or fabricated to a specific shape to fill an irregular void or joint.

This composition can be extruded in various lengths, widths, and diameters for ease of handling, shipping, and storage. For purposes of description we will call this invention brazing bead or extruded brazing shapes.

These braze beads or shapes are made by extruding a fluid compound or mixture of polymers and brazing alloys through an orifice (shaped); curing and/or drying the polymer, and winding the bead or shape on a core or spool.

The braze bead or shape is characterized by excellent flexibility, and elongation. By proper formulation an elastic braze bead or shape can be produced. All versions of the brazing shape can be wound on a spool or core for shipping, storage, or postcure if necessary.

The braze bead or shape is a composite matrix with the general composition of an organic binder combined with a brazing alloy of metal joining powder.

The organic binder system is the component that produces the final physical and chemical properties of the composite matrix such as tensile strength, elongation, chemical resistance, elasticity, and flexibility.

Within the organic binder system are several components which contribute to the final properties of the shape or bead.

An organic resin or polymer is the backbone of the binder system and provides the medium or matrix to support the metal alloys. The organic polymer suitable for the backbone of the brazing beads or shapes can be either thermosetting or thermoplastic and are selected based on the performance expected from the brazing bead or shape before it is actually fired in a furnace to produce its final bond which is metal to metal joining.

In addition to the backbone polymer there may be coreactants, plasticizers, rheological additives, inert resins, filler, and wetting agents added to both the thermosetting and thermoplastic backbone polymers.

Some thermosetting resins and polymers used as backbone resins are epoxy, neoprene, butyl, urethane, and acrylic.

These thermosetting resins and curable elastomers are dried and cured to give mechanical properties to the brazing shapes for handling, storage, and shipment.

Certain of these thermosetting resins and elastomers are dried to handling strength and then cured to final properties as a separate operation due to the length of time and temperatures necessary for optimum cure.

Some coreactants capable of producing brazing shapes with desirable properties are epoxy-acrylic, epoxy-polyamide, urethane-polyol, polyester-isocyanate, and phenolic-acrylic.

To these coreactants may be added placticizers, fillers, inert resins, lubricants, rheological additives, and wetting agents.

Preferred coreactants with thermosetting resins used as matrix or backbone for brazing bead or shapes are epoxy-polyamide, crosslinkable acrylics, and isocyanate-polyol.

Typical plasticizers are phthalates, adipates, glycols, maleates, and oils such as soybean, tung, castor and versions of these which have been bodied, hydrogenated or epoxidized. The amount and type of plasticizer added will depend upon such factors as compatibility with the basic resin system, properties desired of the brazing beads or shape, and the nature of alloy metals being added to achieve the joint or braze.

Additional plasticizers may be thermoplastic resins based on styrene, ethylene, acrylate, vinyl, amide, butadiene, butyl, butylene, and propylene monomers in various combinations as polymers and copolymers.

Generally the level of plasticizer and the number of the materials added as plasticizing or flexibilizing modifiers increases with the inherent rigidity of the polymer backbone. Rigid (when cured) polymers such as phenolics and some epoxies generally require a combination of coreactant and plasticizer to develop the flexibility and other desirable properties of brazing beads on shapes.

Other additives to the organic portion of the brazing shape can be fillers for cost reduction, lubricants for improvement of extrusion performance, rheological additives for flow control during extrusion, drying and cure, wetting agents to aid in dispersion of alloys and fillers and inert resins for organic enhancement.

Thermoplastic resins are suitable as backbone polymers for the formulation of brazing bead or shapes.

Many of these thermoplastic resins are useful as backbone polymers only dried to remove the solvent carrier if the polymer has sufficient flexibility and can absorb the large quantity of alloy required to give a void free braze or joint.

Thermoplastic resins used to prepare brazing beads or shapes include hydrocarbon, acrylic, polyurethane, coumaroun-indene, polybutene, polyamide, and various copolymers of these.

Blends of various thermoplastic resins will produce brazing beads or shapes with properties available from individual resins in proportion to the blend ratio. When certain mixtures of resins and brazing alloy are extruded and dried they produce a bead or shape with considerable surface tackiness. This is corrected by blending in a higher molecular weight resin of the same family or a different but compatible family.

Typical plasticizers for these resins are phtalates, adipates, glycols, maleates, phosphates, hydrocarbon oils, trimellitates, tallates, and oils such as soybean, castor, tung, linseed, and palm. Low molecular weight thermoplastic resins are excellent plasticizers.

Most plasticizer systems for thermoplastic backbone polymers are synthetic products but natural extracted oils such as tung, linseed and soybean have been successfully used.

In systems using a thermoplastic resin backbone and a plasticizer system other ingredients in the organic matrix are solvents to dissolve the polymers, flow control agents, rheological additives, lubricants, wetting agents, and fillers.

The fundamental difference between the thermosetting polymer backbone is that most thermosetting resin blends can be coreacted without solvent to give a brazing bead or shape whereas the thermoplastic backbone may require a small amount of solvent to allow it to be extruded and this solvent may be functioning only as a lubricant in the final matrix of alloy metals and organic binders. It is the drying of the thermoplastic polymer which forms the braze shape.

DETAILED DESCRIPTION

The composition of this invention is a matrix of binder and brazing alloys which is preformed in various shapes by extrusion through a shaped orifice.

The binder is an organic material which may be considered a backbone polymer of definite chemical composition with some modifiers to assist in the formation of the brazing shape, the dispersion of the alloy, or the physical properties of the compound.

The binder compound or backbone polymer may be either thermosetting or thermoplastic resins which will be shown to produce the brazing shape by extrusion, by the following examples:

EXAMPLE I

A binder or backbone polymer system using an epoxy resin which is prepared commercially by dehydrohalogenation of epichlorohydrin and its reaction with a suitable di-or-polyhydroxyl material or other active-hydrogen containing molecule or by the reaction of olefins with oxygen containing compounds such as peroxides or peracids and by dehydrohalogenation of chlorohydrins other than epichlorohydrin.

This epoxy resin or polymer in liquid form at 100% solids may be reacted with suitable curing agents and extruded or cast into brazing shapes, beads, or films. The thermosetting nature of the epoxy resin and hardener and limited working life when combined may require a two component system be formulated and mixed just prior to extrusion of brazing shapes, films, or beads.

|  | Parts by Weight |
| --- | --- |
| Brazing Alloy | = 160 |
| Plasticizer (Dibutyl Phthalate) | = 8 |
| Epoxy Resin (Bisphenol A Epichlorohydrin liquid epoxy resin - Epoxy equivalent weight 170–230) | = 2.5 |
| Liquid Aliphatic Amido Amine curing agent (Amine equivalent weight 70–100) | = 2.5 |

In the foregoing example the brazing alloy may be varied from about 100 to about 250 parts by weight in order to compensate for the differences in binder acceptance or absorption of various alloys and to adjust the viscosity of the mixture for extrusion.

The plasticizer content of this example may be varied from about 2 to 30 parts by weight in order to wet out the braze alloy, lower the mixed viscosity for extrusion or to lubricate the extrusion orrifice.

The mixed epoxy-aliphatic amido amine content of this example may be varied from about 1 to 25 parts by weight depending upon the strength, viscosity, flexibility, cure time and cure temperature both in the cured and uncured state.

The epoxy resin to hardener ratio of the foregoing example may be varied from about 10 parts by weight epoxy to 90 parts by weight hardener or 15 parts by weight hardener to 85 parts by weight epoxy.

Depending on the epoxide equivalent-amine equivalent ratio the ratios of epoxy to hardener may be varied to suit these values.

The preferred mixing procedure is to weigh out the brazing powder alloy and add the plasticizer (dibutyl phthalate in this example) until the powder is uniformly dampened. The premixed epoxy resin and hardener is then added and the batch is mixed to produce a uniform mix or slurry. The mix is loaded into a container from which it is extruded by pressure which may be adjusted depending on shape of bead and viscosity of the mix.

Mixing the formulation can be done on any suitable stirrer and the potlife of the blended brazing compound will be 2 to 8 hours at 25° C.

Certain complex shapes may require a small amount of a flow control substance such as a silica or an organic resinous polymer.

The viscosity of the resin-alloy blend may be adjusted for extrusion by adding additional alloy powder if too low or dibutyl phthalate if too high.

In the foregoing example changing the amount of blended epoxy resin and hardener will require a change in the ratio of plasticizer necessary to develop, retain, or improve the flexibility of the braze shape which is extruded from this operable formulation.

Epoxy resins suitable for incorporation and (formulation) into example I are Shell Epon 828, Epon 815, Epon 813, Celanese Epirez 507,508,509,510, 50732, CIBA 502,507, 508, 6004, 6020, and others commercially equivalent to these.

Curing agents suitable for incorporation into Example I are commercial products of Celanese Corporation such as Epicures 852, 855, and 856 as well as commercial equivalents produced by CIBA, Shell, and Pacific Anchor Chemical Companies.

Utilizing the same epoxy resins and others capable of reaction with poly amido amines other curing agents suitable for formulation of mixtures which may be used to fabricate brazing beads, shapes, films, or strip are liquid polyamide resins with amine values from 80 to 400 and commercially produced by Henkel Corporation as Versamids 115, 125, 140, Celanese Chemical as Epicure 8515, 8525, and Shell as V-15, V-25 and V-40. The use of the liquid polyamide to produce a braze shape is described in Example 11.

EXAMPLE II

|  | Parts by Weight |
| --- | --- |
| Brazing Alloy | = 150 |
| Plasticizer (Dibutyl Phthalate) | = 12 |
| Epoxy Resin (Bisphenol-A-Epichlorohydrin liquid epoxy resin - epoxy equivalent weight 170–230) | = 3.6 |
| Liquid Polyamide Resin Amine value 80 to 400 | = 2.4 |

In the foregoing example the braze alloy may be varied from about 100 to about 250 parts by weight in order to compensate for the differences in binder acceptance and absorption of various alloys and to adjust the viscosity of the blend for extrusion.

The plasticizer content of this example may be varied from about 4 to about 40 parts by weight in order to compensate for the higher viscosities of the blended epoxy polyamide resins, to wet out the braze alloys, or to lubricate the extrusion.

The mixed epoxy resin polyamide content of this example may be varied from about 3 to about 30 parts by weight depending upon the flexibility, viscosity, strength, cure time, and cure temperature desired both before and after curing.

The epoxy resin to polyamide ratio may be varied from 10 parts by weight epoxy to 90 parts by weight polyamide or 20 parts by weight polyamide to 80 parts by weight epoxy. Depending upon the epoxide equivalent-amine value, the ratios of epoxy to polyamide may be varied to suit these values in this operable formulation. Flexibility and elongation are significantly improved in Example II by adding epoxy polyamide with a ratio of 2 epoxy to 4 polyamide in place of stated quantities of 3.6 epoxy to 2.4 polyamide.

As in Example I a final viscosity adjustment can be made by adding a small amount of dibutyl phthalate if too high or powder if too low. Usually 2% is sufficient to adjust viscosity.

In the foregoing Examples I and II the binder to braze alloy ratios are 7.5% for Example I and 10.7% for Example II.

In the foregoing Examples I and II the plasticizer is considered a part of the binder and a flexibilizing component of the backbone polymers which are thermosetting epoxies cured by polyamine and polyamide hardeners.

Substitution of a stop-off alloy or pigment based on aluminum oxide or zirconium silicate may require a reduction in binder levels to 2.5 to 4% of total as can be observed with certain metal alloys which seem to require less binder to provide a flexible matrix with these thermosetting binder systems.

In a preferred embodiment of the invention a resinous or polymeric plasticizer in used in place of dibutyl phthalate. Example III includes a polymeric plasticizer to physically soften the thermosetting epoxy polymer.

EXAMPLE III

|  | Parts by Weight |
|---|---|
| Thermosetting Emulsion Polymer (Heat setting self reactive or with dispersed curing agent systems) | = 20 |
| Braze Alloy | = 225 |
| Wetting Agents | = as required |

The emulsion polymer of Example III may be between 30 and 65% solids by weight. The curing agents, catalysts and reactive resins are blended into the emulsion before adding the braze alloy powder. The braze alloy is then added into the emulsion to a working viscosity for extrusion in the preferred mixing procedure.

The braze alloy in the foregoing example may be varied from about 150 to 350 parts by weight depending on its density and the ability of the binder resin to wet out powder. If the chemical composition of the braze alloy or its particle size or shape cause the reactive emulsion to lose its colloidal dispersion, a suitable wetting agent may be mixed in before addition of the braze powder or coated on the powder before it is added to the emulsion.

Some emulsions which have been successfully formulated into braze beads, strips, or shapes are Hycar 2671 and Hycar 2679, from B. F. Goodrich Co. and Rhoplex HA-8 and Rhoplex E-32 from Rohm and Haas Co.

These thermosetting materials are heat reactive acrylic polymers and other chemically and functionally equivalent acrylic polymers may be heat cured with or without a catalyst or coreactant. It is helpful to select a catalyst or coreactant which will gell the acrylic polymer at low temperature and in a short cycle to avoid the possible sagging or slumping of the braze shape or bead or heat up to cure temperature.

The introduction of catalyst such as oxalic acid, phosphoric acid, urea resin, or melamine resin into the binder portion of the foregoing example may speed up the gell and cure times and prevent sagging, slumping, or prolonged cure time in the oven or an ambient temperature.

Generally the level of catalyst will depend on the speed of cure desired, the braze alloy selected, and the flexibility and elasticity required of the braze shape as extruded.

Catalysts such as oxalic acid, ammonium nitrate, and phosphoric acid self cross link the acrylic polymer and are used at low levels like 1 to 10 parts by weight of dry polymer.

Catalysts such as urea and melanmine resins may be used both as catalysts and in larger amounts cross linking coreactant resins.

The procedure is to mix the emulsion with catalyst then add the braze powder to a viscosity suitable for extrusion. About 300 parts by weight produces a viscosity suitable for extrusion with most alloys of metals and types of stop-off powders.

In addition to the variation in braze alloys and stop-off powders for adjusting the viscosity of Example VI a small amount of a commercially available colloidal silica gelling agent such as Cab-O-Sil may be added to adjust the viscosity or rheology of the mixture before casting or extrusion. The Cab-o-Sil addition tends to change the rheological properties on the side of forming an extrudable paste which is in effect an increase in real viscosity. To reduce the viscosity or increase the flow of Example III a small amount of BYK 905 or BYK 980 wetting agents supplied by BYK Malinkrodt will suffice.

The Cab-o-Sil is added to the blends in Example III at the end of the mixing procedure and the viscosity of the blend will depend upon the amount added but also on its interaction with the braze alloy, stop-off, and polymer backbone, The Cab-o-Sil is shear dependent is some formulation so that a gell structure is formed which flows with pressure to produce a bead or shape.

The BYK 980 or similar wetting agent may be added as a final step, which is least effective because of the relatively high viscosity at this point, or to the polymer backbone resin, which is more effective and requires about 50% less material to achieve a significant viscosity reduction, or may be mixed with the braze alloy or stop-off powder by rolling in a jar mill, which with certain powders is the preferred approach.

Within the thermosetting polymer grouping of the preferred embodiments of the invention are blends of thermosetting resins such as acrylics, phenolics, and epoxies. These blends may be coreacted resins such as acrylic-phenolic and acrylic-epoxy or mixtures of polymers which have individual curing agents for each component and blend to form a matrix structure which like certain metal alloys have the best characteristics of each moderated by the blended resin. In a preferred embodiment of the invention the amount of phenolic resin added to the thermosetting acrylic serves to increase its heat resistance without imparting bittleness.

The amount of modifying or co-reactive resin such as phenolic is usually less than 50% of the solid weight of the primary or backbone polymer and is illustrated in Example IV.

EXAMPLE IV

|  | Parts by Weight |
|---|---|
| Thermosetting or cureable Emulsion Polymer | = 20 |
| Modifying Resin | = 5 |
| Braze Alloy or Stop-off Powder | = 225 |

In the foregoing example the emulsion polymer may be heat crosslinking acrylic resin, nitrile rubber latex, neoprene rubber latex, vinyl pyridine latex, urethane latex, epoxy emulsion and may be varied from about 5 to about 50 parts by weight.

To the thermosetting emulsion polymer of Example IV was added the appropriate curing agent systems to produce a full cure at moderate temperature, In the foregoing example the modifying resin may be a thermosetting resin such as phenolic, epoxy, urethane, acrylic, urea formaldehyde, and may be varied from about 1 to about 30 parts by weight.

In the foreging example the modifying resin may be a thermoplastic resin such as phenolic, acrylic, vinyl, polystyrene, hydrocarbon, coumarone, indene, styrene, and may be varied from about 1 to about 50 parts by weight.

In the foregoing example the braze alloy or stop-off powder may be varied from about 80 to about 400 parts by weight.

From the foregoing example we will offer a more specific example.

In a preferred embodiment of the invention the epoxy added to the cross-linking acrylic serves to increase its heat resistance and add toughness to the polymer matrix or backbone.

EXAMPLE V

|  | Parts by Weight |
|---|---|
| Heat Cross-linkable Acrylic Resin | = 20 |
| Epoxy/Polyamide 2 p.b.w. Epon 828/3 p.b.w. V-40 | = 5 |
| Braze Alloy | = 300 |

The epoxy/polyamide was blended and added to the acrylic emulsion. The braze alloy was then added and the mixture extruded by air pressure.

In the foregoing example the heat cross-linkable acrylic resin may be varied from about 5 to about 50 parts by weight.

In the foregoing example the epoxy/polyamide blend may be varied from about 1 to about 10 parts by weight.

In the foregoing example the brazing alloy may be varied from about 200 to 400 parts by weight in order to adjust the viscosity for extrusion based on the properties of the various alloys.

In the foregoing example the epoxy polyamide may be replaced by a water soluble or emulsifiable phenolic resin and a similar braze shape may be extruded with improved temperature stability.

Another preferred embodiment of the invention is the isocyanate-polyol or reactive urethane-polyol thermosetting backbone.

When an pure isocyanate or a partially reacted isocyanate is reacted with a hydroxyl containing material a polymer is formed with thermosetting characteristics. By proper selection of isocyanate and polyol a very flexible, tough, and elastic backbone matrix for braze beads, shapes, and strips may be made.

Preferred embodiments of the invention may be shown by the following examples of urethane backbone polymers.

EXAMPLE VI

|  | Parts by Weight |
|---|---|
| DDI 1410 | = 4 |
| Poly-G-30-168 | = 5 |
| (Urethane Grade) Ethyl Acetate | = 4 |
| Braze Alloy | = 300 |

In the foregoing example the DDI 1410 is a diisocyanate and is based on a long chain dimerized fatty acid with a 36 carbon atom backbone and is available from Henkel Resin Corporation.

The polyol Poly-G-30-168 is one of several products available from Olin Corporation and others including Basf-Wyandotte Corporation.

The reaction time for the foregoing example is normally 18 hours at 25° C. but may be accelaerated with heat to produce a continous strip or strand of braze bead or shape. As in some epoxy polyamide and acrylic examples the compounded shape material may be extruded at room temperature, gelled at room temperature to preserve the matrix shape or dimensions and postcured at elevated temperature.

In the foregoing example the tensile strength, elongation, flexibility, and hardness of the braze bead, strip, or shape may be adjusted by changing the ratio of polyol to diisocyanate with the ratio of polyol increasing giving a generally softer backbone and more rigid if replaced with lower molecular weight materials.

In the foregoing example the preferred mixed procedure is to mix the di-isocyanate with the polyol, and the braze alloy, and reduce viscosity to extrusion or casting consistency by adding the ethyl acetate.

In the foregoing example the DDI 1410 may be varied from about 1 to about 10 parts by weight.

In the foregoing example the Poly-G-30-168 may be varied from about 1 to about 30 parts by weight.

In the foregoing example the ethyl acetate may be varied from about 0 to about 10 parts by weight.

In the foregoing example the braze alloy may be varied from about 200 to about 550 parts by weight.

EXAMPLE VII

|  | Parts by Weight |
|---|---|
| Lupranate M-20 | = 4 |
| Pluracol P-410 | = 5 |
| Braze Alloy | = 120 |

In the foregoing example the Lupranate M-20 is a solvent free polymethylene polyphenyl isocyanate with approximate functionality of 2.7 and Pluracol P-410 is a polyether polyol with an OH number of 265 and both are available from Basf-Wyandotte Corporation. The backbone polymer formed by reaction of these two polyfunctional materials may be made harder, softer, stronger, more flexible or elastic by varying the ratio of M-20 to P-410.

In the foregoing example the replacement of Pluracol P-410 with Pluracol-P-2010 with OH number of 56 will produce a softer compound for a backbone polymer and will require some adjustment in the braze alloy added to compensate for the softer polymer backbone.

In the foregoing example the preferred mixing procedure is to mix the isocyanate and polyol and add the braze alloy to a viscosity suitable for extrusion or casting.

In the foregoing example the Lupranate M-20 may be varied from about 1 to about 10 parts by weight.

In the foregoing example the polyol may be varied from about ½ to 30 parts by weight.

In the foregoing example the braze alloy may be varied from about 80 to about 200 parts by weight.

Other isocyanates such as toluene diisocyanate, diphenyl-methane diisocyanate, carbodi-imied modified MDI, urethane modified MDI and blends of TDI and MDI may be used with polyols of various molecular weights and configurations including polyether triols and polyether tetrols may be used to produce a backbone polymer to use as matrix for a braze bead, shape, or strip.

These backbone polymers may be further formulated with plasticizers and additives to develop properties necessary for production or application of the braze bead, strip, or shape.

Plasticizers used with previous epoxy examples such as dibutylphthalate, Piccolastic A-5, and hydrocarbon resins may be added to the foregoing urethane backbone polymers to improve flexibility, reduce cost, or provide improved properties by wetting out the braze alloys.

While the foregoing examples were of three types of themosetting resins and elastomers it is obvious from our work that other backbone polymers such as nitrile-epoxy, phenolic-acrylic, urethane-polyol, phenolic-neoprene, vinyl phenolic and alkyd-polyol will produce a braze bead, strip, or shape with some flexibility and ability to perform as the preferred embodiments of Examples I through X do perform we will not include examples of each of these backbone structures but we will comment that the ratio of braze alloy to binder with some of the aforementioned backbone thermosetting and combinations of thermosetting and thermoplastic binders whether coreacted or blended may be from about 5 to 25% of the total weight of the formulation and for this reason our development work was concentrated on the foregoing examples.

The preferred embodiments produced thermosetting beads and shapes at ratios from 1.5 to 10% total weight of binder.

When a thermoplastic resin is selected as the backbone polymer for a braze bead or shape it may be an inherently flexible low molecular weight material or a hard brittle high molecular weight material and the final determination as to which base or backbone polymer to select will be the properties required of the braze bead or shape.

Other factor bearing on the selection of resin will be the chemical resistance of dried shapes, flexibility of beads, elastic properties of shapes and heat resistance of beads or shapes during handling and shipping. Certain production conditions may require switching to a thermosetting bead or shape using the same braze alloy or powder.

The preparation of some selected braze shapes, beads or strips will be shown by the following detailed examples, which represent preferred embodiments of the invention.

EXAMPLE VIII

In order to produce an extremely flexible cylindrical bead a polystyrene resin from Hercules Chemical Co. was selected as the backbone polymer and another polystyrene resin was selected as plasticizer.

|  | Parts by Weight |
| --- | --- |
| Piccolastic E-125 (65% soilds in methyl ethyl Ketone) | = 6 |
| Piccolastic A-5 | = 7 |
| Braze Alloy | = 140 |

The preferred mixing procedure of Example VIII is to premix the Piccolastic E-125 solution and Piccolastic A-5. Then add braze alloy to a consistency suitable for extrusion.

In large batches the addition of some methyl ethyl ketone may be necessary to make up for material lost due to evaporation during mixing.

In the foregoing example the Piccolastic E-125 is considered the backbone polymer and may be varied from about 3 parts by weight to about 15 parts by weight which variation is necessary to produce uniform dispersion with certain braze alloys. The Piccolastic A-5 as the primary plasticizer for the E-125 backbone polymer may be varied from about 2 parts by weight to about 20 parts by weight to keep the braze bead or shape flexible. When a strip or shape other than cylindrical is formed or extruded the braze alloy to Piccolastic A-5 ratio will determine the proper viscosity for extrusion and also the retention of the shape or configuration during and after drying. When the drying is done in an oven as with a continuous extrusion process the dried shape, bead, or strip may be wound on spools or cores.

In the foregoing example the ratio of binder consisting of backbone polymer and plasticizer to braze alloy is 8.5% based on wet binder and 7.2% based on dry binder. Some braze alloys and powders will require the ratio of backbone polymer and plasticizer be changed from 3.9 parts dry weight of backbone polymer to 7 parts by weight of plasticizer (which is 100% solids) to other ratios such as 0.5 parts backbone polymer to 5 parts plasticizer because the shape and/or size of the braze alloy particles or their rigidity or flexibility when formed into shapes. This rigidity or flexibility is dependent on particle size, shape, and chemical composition and may cause the binder to braze alloy percentage concentration to vary from 1.5% dry to 20% dry. Certain nickel alloys require larger amounts of some binders to produce flowable or castable mixes.

The addition of wetting agents or materials to improve the surface coating of the individual particles dispersed in the backbone polymer matrix is one method of reducing the amount of binder required to produce a given braze bead, shape, or strip.

In Example IX is shown a preferred embodiment of the invention with a typical wetting agent.

EXAMPLE IX

|  | Parts by Weight |
| --- | --- |
| 20% Morton CA-100 in Methyl Ethyl Ketone | = 12.4 |
| Piccolastic A-5 | = .82 |
| BYK-980 | = 1.5 |
| Nickel Alloy | = 140 |
| Acetone | = 5 |

In the foregoing example the BYK-980 was blended with the binders prior to adding the nickel alloy braze powder and the acetone was added to reduce viscosity because the mixture was to be extruded through a 0.030" diameter orifice to produce a cylindrical shape of very small cross section.

In the foregoing example it is obvious that the backbone, polymer Morthane CA-100 (an ester based, elastomeric polyurethane resin in granular form) required only a very small amount of primary plasticizer (Piccolastic A-5) to produce a formed and flexible shape and strip with a very small cross sectional areas.

It is also obvious from the foregoing example that very little binder is necessary to produce a useful brazing shape when a suitable wetting aide or agent is employed. The actual binder dry percentage is 2.9 including the wetting agent and without the wetting agent (BYK-980) percentages of 3.5 to 6.0 (dry) were necessary. It is also important to note that not all examples have nor do they require a wetting agent which will increase the cost of the formulation if added when not necessary.

The addition of acetone in the foregoing example was made to reduce the viscosity and to accelerate the drying rate of the bead or strip. The formulation of example IX is designed for rapid drying at low temperatures such as 20° to 30° C. and replacement of the acetone by methyl isobutyl ketone would increase the drying time as might be necessary if a larger cross section shape, bead, or strip were required.

In the foregoing example the Morthane C100 may be varied from about 6 parts by weight to about 25 parts by weight.

In ther foregoing example the Piccolastic A-25 may be varied from about ½ to about 10 parts by weight.

In the foregoing example the nickel alloy powder may be varied from about 100 to about 200 parts by weight.

In the foregoing example the BYK-980 may be varied from about 1/10 parts by weight to about 3 parts by weight.

In order to further describe the preferred embodiment of the invention as it relates to urethane polymers for the backbone of the matrix example is formulated.

EXAMPLE X

|  | Parts by Weight |
|---|---|
| 20% Morthane CA-250 in Acetone | = 8 |
| Piccolastic A-25 | = 4 |
| Braze Alloy | = 140 |
| Acetone | = as required |

In this preferred example of the embodiment of the invention the ratio of polyurethane resin to primary plasticizer has been adjusted in the direction of 2.5 times as much plasticizer as resin due to the inherent stiffness of a braze alloy when dried in the polymer matrix.

Replacement of the Piccolastic A-25 with Piccolastic A-5 produce a braze bead or shape with more mechanical strength as measured by tensile strength and elongation but may require less solvent addition to produce a mix viscosity that is easily extruded.

The binder concentration in the foregoing example is 7.9% on a wet basis and 3.8% on a dry basis and must be adjusted for various braze alloys and powders added.

In the foregoing example the morthon CA-250 may be varied from about 2 to about 12 parts by weight.

In the foregoing example the Piccolastic A-25 may be varied from about 2 to about 20 parts by weight.

In the foregoing example the Braze Alloy may be varied from about 80 to about 200 parts by weight.

In the foregoing example the acetone is added to adjust the viscosity of the mixture prior to extrusion of the braze strip, shape, or bead and may be varied from 0 parts to about 10 parts by weight.

In examples IX, X the viscosity of the final mix will determine flow rate of the extrusion. The rapid drying of the acetone component allows for shapes to be extruded at speeds from 6 to 30 inches per minute through an orrifices with diameters of 0.020" to 0.080" or a composite shape of approximately this mass. The pressure needed for extrusion may vary with the viscosity of the mixture and the speed of extrusion with 50–120 psi being a practical range for most shapes, beads, or strips.

As the beads or shapes are extruded from the orrifice the acetone component and the high solids contribute to a freezing of the bead or shape which may be accelerated by extruding into a warm atmosphere such as a drying oven with a moving conveyor to carry the shape, bead, or strip to the heat or by passing warm air over the shape with a heat gun or blower just as it leaves the orrifice.

It is obvious from the examples that the viscosity and solids must control the extrusion rate and the solvent(s) control the dry rate and rate of production of the shape, bead, or strip.

Another example of a shape of bead formed from a polymer backbone and plasticizer is called braze stop-off shape.

This is a preferred embodiment of the invention using a non metallic material called stop-off powder and it prevents the run down of braze alloys during the fusion cycle. These stop-off materials are usually aluminum oxide, zirconium oxide, or zirconium silicate and supplied as finely divided powders.

Forming stop-off powder into a strip may be done as in Example XI.

EXAMPLE XI

|  |  | Parts by Weight | % Solids |
|---|---|---|---|
| 20% CA-100 in MEK | = | 56.25 | 11.25 |
| Piccolastic A-25 | = | 3.5 | 3.5 |
| Ethyl Acetate | = | 29 |  |
| Aluminum Oxide Stop-off | = | 195 | 195 |
|  |  | 283.75 | 209.75 |

In the foregoing example the viscosity and solids (73.9%) are designed for extruding to produce a dried strip with a thickness of 0.020" to 0.030".

In order to extrude a stop-off shape the Ethyl Acetate from Example XI must be replaced by a small amount of acetone and the concentration of stop-off powder raised by the addition of 150 parts by weight which raises the total solids range to 88 to 91%.

In the foregoing example the Morton CA-100 may be varied from about 4 to about 20 parts by weight of solids.

In the foregoing example the Piccolastic A-25 may be varied from about 2 to about 20 parts by weight.

In the foregoing example the Ethyl Acetate may be varied from about 5 to about 40 parts by weight.

In the foregoing example the stop-off powder may be varied from about 125 to about 600 parts by weight.

The particle size and oil absorption or surface area of the stop-off powder controls the viscosity and solids of the mixture by requiring additional solvent if too high or a reduction in solvent if too low for extrusion when a small orrifice is used.

In the foregoing example the action of the stop-off shape, bead, or strip acts differently from the braze metal in that the powder stops the flow of metal or confines the flowing alloy to the joint. The mechanism for placing the stop-off material in place by fabricating it into a shape is the same as for a braze alloy.

When primary thermoplastic resins were considered for backbone polymers in the development of the invention many materials were evaluated for their ability to be compounded into a shape with braze alloys and not fully developed because of certain properties which made them less desirable than others in the foregoing examples.

It is our intention to exemplify several types which have been successfully formulated to illustrate the large number of potential backbone polymers. And using the technique of the present invention produce a braze shape, bead, or strip.

When thermoplastic acrylic resins are considered they are numerous and available in both solvent and aqueous systems.

In the following example is an embodiment of the invention using a thermoplastic acrylic resin as a backbone polymer.

EXAMPLE XII

|  | Parts by Weight |
| --- | --- |
| Acrylic CS-1 | = 8 |
| Paraplex G-50 | = 2 |
| Ethylene Glycol | = 1 |
| Dibutyl Phthalate | = 1 |
| Braze Alloy | = 140 |
| Xylene | = 2 |

In the foregoing example the Acryloid CS-1 is an acrylic solution polymer of high total solids available from Rohm and Haas CO. The Paraplex G-50 is a medium molecular weight, non volatile, polyester plasticizer which controls the tackiness of the formulation an can enhance the flexibility with certain braze alloys.

In the following example the thermoplastic acrylic resin was supplied in emulsion form and compounded for maximum flexibility.

EXAMPLE XIII

|  | Parts by weight |
| --- | --- |
| Rhoplex AC-33 | = 40 |
| Braze Alloy | = 400 |

Rhoplex AC-33 is available from Rohm and Haas Co.

Another typical example of an emulsion resin which is thermoplastic and may be formulated into a braze shape is vinyl acetate-acrylic copolymer.

EXAMPLE XIV

|  | Parts By Weight |
| --- | --- |
| Gelva TS-100 | = 40 |
| Dibutyl Phthalate | = 10 |
| Braze Alloy | = 450 |

Gelva TS-100 is available from Monsanto Chemical Co.

In the foregoing example the backbone polymer with primary plasticizer may produce various degrees of flexibility based on the amount of plasticizer added. In addition a combination of plasticizers may be added to develop desirable properties such as toughness as well as flexibility.

It is possible to produce a brazing shape using a solvent version of vinyl acetate and vinyl acetate copolymers both with and without primary and secondary plasticizers. The primary plasticizer in both solvent and water based thermoplasted backbone polymers may be another resin or polymer which when added to the backbone resin polymer changes its physical properties making it suitable for forming a braze shape.

Various combinations of vinyl acetate and vinyl acetate copolymers were compounded with thermoplastic elastomers as primary plasticizers with good results in flexibility and elongation.

Although the foregoing examples illustrate a number of thermosetting and thermoplastic embodiments of the invention the final properties of the braze shape will ultimately determine which backbone polymer is selected and whether that polymer is thermosetting or thermoplastic in the classic sense.

In general a thermosetting backbone polymer such as an epoxy-polyamide or acrylic phenolic gives excellent strength and shape retention to the braze bead or strip with somewhat less flexibility and elongation than may be obtained with a thermoplastic polymer such as a urethane, hydrocarbon, or vinyl.

When the braze shape requires a complex mixture of properties such as chemical resistance, elongation, and low burn out temperature the only feasible method of satisfying these diverse requirements may be to formulate with several different polymers such as epoxy and urethane from the thermosetting types and acrylic and vinyl from the thermoplastic types. A performance test will then select the polymer most able to meet these diverse criteria and produce a stable shape or configuration.

One of the most desirable properties of these brazing beads, shapes, or strips is precise amounts of braze alloy in a small cross sectional area which makes a uniform joint in strength as well as appearance. Extrusions as small in diameter as 0.015" were successfully produced as cylindrical bead and easily bonded into areas where previously used methods such as paste and powder were successful only on repeated applications or not at all.

In addition to the ease of handling the braze shapes the method lends itself to producing a product with low binder ratios which make burn out prior to metal melting and brazing easier than with current tapes and pastes.

What is claimed is:

1. A flexible brazing composition comprising, as a matrix, a minor proportion of an organic polymer as a binder and a major proportion of a braze alloy, said composition made and shaped by extrusion.

2. The brazing composition of claim 1 having a diameter range from 0.020 inches to 0.30 inches.

3. A brazing composition as claimed in claim 1, wherein the organic polymer is a thermosetting agent.

4. The composition of claim 3 wherein the thermosetting agent comprises the reaction product of an isocyanate with a hydroxy containing material selected from the group consisting of a polyol, acrylic and polyurethane resin.

5. The composition of claim 3 wherein the thermosetting agent is an epoxy resin and a hardener for said resin.

6. The composition of claim 5 wherein the composition comprises the reaction product of an epoxy resin and a component selected from the group consisting of polyamide, amidoamine, acrylic, isocyanate, urethane polymers and mixtures thereof.

7. The composition of claim 1 which comprises as the organic polymer a flexible elastomeric latex.

8. A brazing composition as claimed in claim 1 wherein the organic polymer is a thermoplastic polymer selected from the group consisting of polyurethanes, and acrylates.

* * * * *